INVENTORS
DAVID K. BARTON
WILLIAM J. ROSE
BY Arthur L. Collins
ATTORNEY

July 20, 1965  D. K. BARTON ETAL  3,196,433
PASSIVE RADAR TRACKING APPARATUS
Filed Dec. 4, 1962  2 Sheets-Sheet 2
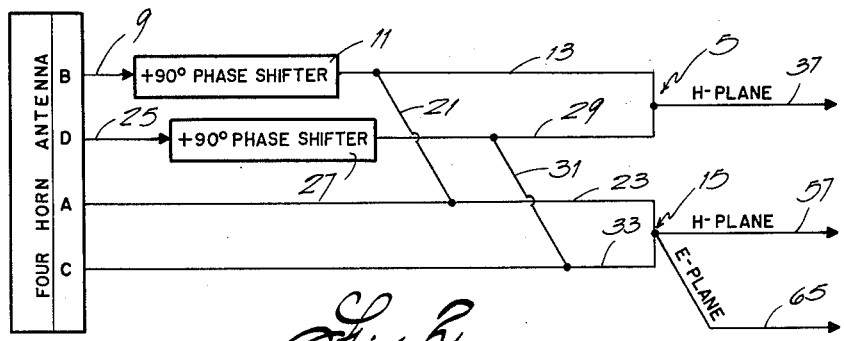
Fig. 2
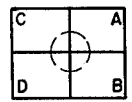 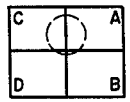 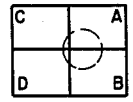 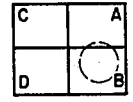
Fig. 2A  Fig. 2B  Fig. 2C  Fig. 2D
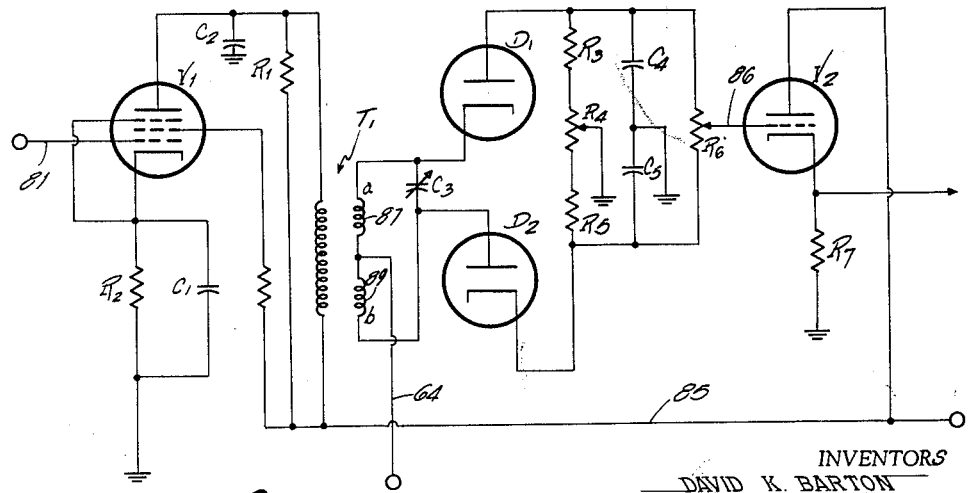
Fig. 3
INVENTORS
DAVID K. BARTON
BY WILLIAM J. ROSE
Arthur L. Collins
ATTORNEY United States Patent Office 3,196,433
Patented July 20, 1965

3,196,433
PASSIVE RADAR TRACKING APPARATUS
David K. Barton, Haddonfield, and William J. Rose, Moorestown, N.J., assignors, by mesne assignments, to the United States of America as represented by the Secretary of the Navy
Filed Dec. 4, 1962, Ser. No. 243,197
1 Claim. (Cl. 343—7.4)

The present invention relates to novel and improved radar tracking systems and more particularly to novel and improved methods and apparatus for tracking target objects which radiate jamming signals or other noise energy signals of their own.

Conventional monopulse tracking radar systems ordinarily develop a tracking error signal from pulsed energy radiated by the radar transmitter and reflected by the target object to the radar equipment. It often also becomes desirable however to track a target object which originates its own jamming signal or any other suitable noise energy signal or the like.

It is, therefore, a principal object of the present invention to provide novel and improved radar tracking methods and apparatus which is easily adapted to track a target whether it generates a signal of its own or not.

It is a further object of the present invention to provide novel and improved methods and apparatus for sensing noise energy radiated by the sun, other objects, or other celestial bodies.

Other objects and many of the attendant advantages of this invention will be readily appreciated as the same becomes better understood by reference to the following detailed description when considered in connection with the accompanying drawings wherein:

FIG. 2 is a more detailed diagrammatic view of the four horn antenna and feed assembly shown in FIG. 1;

FIGS. 2A–2D are diagrammatic frontal views of the four horn antenna showing the various ways in which the incoming signal may be focused upon the horn array;

FIG. 3 is a schematic view of a preferred embodiment of the error detector shown in FIG. 1 of the drawing.

Figure 1:
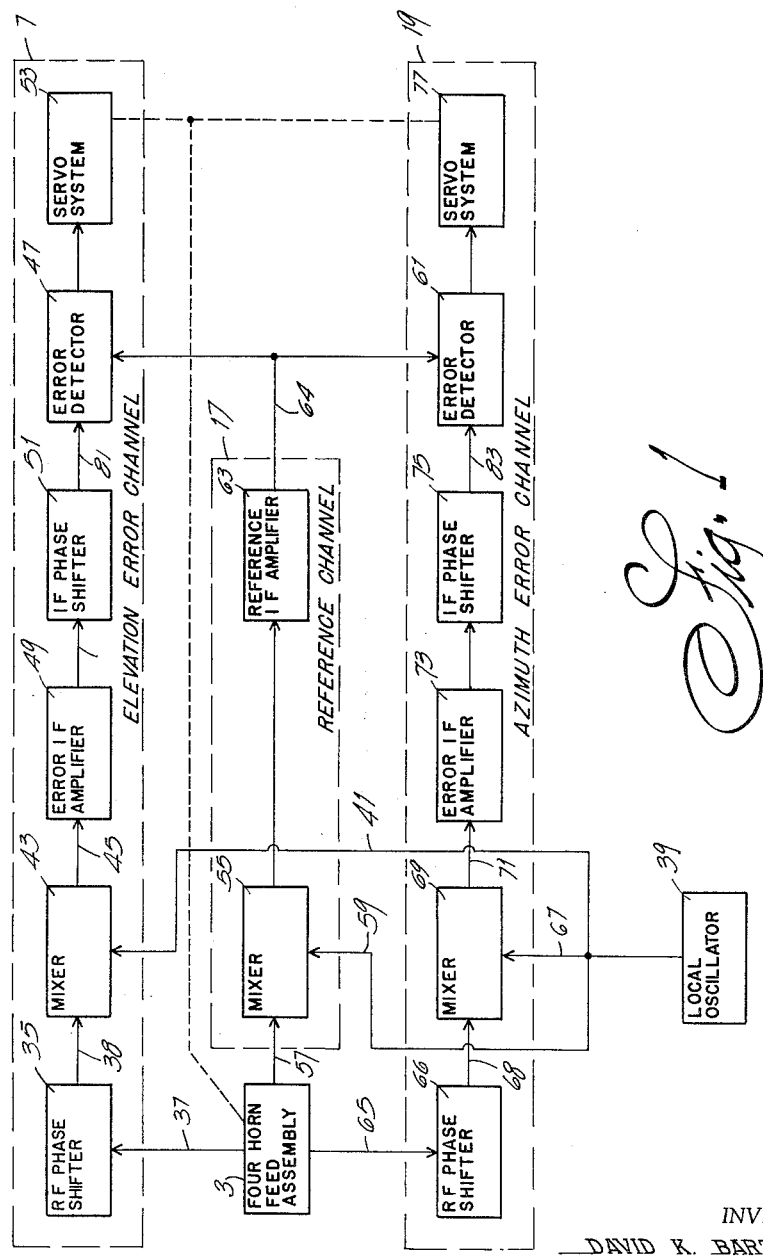
FIG. 1 is a diagrammatic view of a preferred embodiment of the present invention.

Briefly, the improved monopulse radar apparatus of the present invention includes the combination of an antenna assembly of four horns arranged in a rectangular configuration, and waveguide circuitry, which combines the signals received in each of the horns in a unique manner so as to provide a reference signal which represents the additive sum of energy received in all four horns, an elevation signal which represents the difference in energy received in upper and lower pairs of horizontally disposed horns, and an azimuth signal which represents the difference in energy received in opposite sides of the vertically disposed pairs of the horns. The elevation and azimuth signals are then adjusted in phase so as to be in phase or 180 degrees out of phase with the reference signal, converted to an intermediate frequency, and compared with the reference signal which has also been converted to the predetermined intermediate frequency. Elevation and azimuth error signals are obtained from the comparison circuitry and may then be used to adjust the antenna assembly so that it accurately tracks the selected target.

A preferred embodiment of the present invention is illustrated in FIGS. 1–3 of the drawing. As shown therein, the four parallel waveguide sections or horns of the antenna assembly 3 are preferably positioned in a rectangular configuration. Horn B of the assembly 3 is coupled to the H plane of the magic T section 5 and elevation error channel 7 of the circuit successively through energy conductor 9, the +90° phase shifter 11 and energy conductor 13. Horn B of the assembly is also coupled to the H and E planes of the magic T section 15 and the reference and azimuth error channels 17 and 19 of the circuit successively through energy conductor 9, the +90° phase shifter 11 energy conductor 13, the short slot hybrid coupler 21, and energy conductor 23. Coupler 21 equally divides the energy from phase shifter 11 between conductors 13 and 23 and also applies a —90° phase shift to the signal that passes on to conductor 23. Horn D of the assembly 3 is coupled to the H-plane of the magic T section 5 and the elevation error channel 7 of the circuit successively through the energy conductor 25, the +90° phase shifter 27, and energy conductor 29. Horn D of the assembly is also coupled to the H and E planes of the magic T section 15 and the reference and azimuth error channels 17 and 19 of the circuit successively through energy conductor 25, the +90° phase shifter 27, energy conductor 29, the short slot hybrid coupler 31, and energy conductor 33. Coupler 31 equally divides the energy from phase shifter 27 between conductors 29 and 33 and also applies a —90° phase shift to the signal that passes on to conductor 33. Horn A of the assembly 3 is coupled to the H and E planes of the magic T section 15 and the reference and azimuth channels 17 and 19 of the circuit through the energy conductor 23. Horn A of the assembly is also coupled to the H-plane of the magic T section 5 and the elevation error channel 7 successively through the energy conductor 23, the short slot hybrid coupler 21, and energy conductor 13. Coupler 21 equally divides the energy $E_a$ between conductors 13 and 23 and applies a —90° phase shift to the signal that passes on to conductor 13. Horn C of the assembly is coupled to the H and E planes of the magic T section 15 and the reference and azimuth error channels 17 and 19 of the circuit through energy conductor 33. Horn C of the assembly is also coupled to the H plane of the magic T section 5 and the elevation error channel 7 of the circuit successively through the energy conductor 33, the short slot hybrid coupler 31, and energy conductor 29. Coupler 31 equally divides energy $E_c$ between conductors 33 and 29 and applies a —90° phase shift to the signal that passes on to conductor 29.

The H plane of the magic T section 5 is coupled to the R.F. phase shifter 35 of the elevation error channel through conductor 37. A signal of predetermined frequency directed from the local oscillator 39 through conductor 41 is combined in the mixer circuit 43 with the the output signal of R.F. phase shifter 35 to provide an I.F. error signal on conductor 45 which is coupled to the error detector 47 through the error I.F. amplifier 49 and the I.F. phase shifter 51. The elevation servo system 53 is coupled to the output circuit of the error detector 47.

The H plane of the magic T section 15 is coupled to the mixing circuit 55 of the reference channel 17 through conductor 57. The local oscillator 39 is also coupled to the mixer 55 through conductor 59. The output circuit of mixer 55 is coupled to the error detectors 47 and 61 of the elevation and azimuth error channels through the reference I.F. amplifier 63 and conductor 64.

The E plane of the magic T section 15 is coupled to the R.F. phase shifter 66 of the azimuth error channel 19 through conductor 65. A signal of predetermined frequency directed from the local oscillator 39 through conductor 67 is combined in the mixer circuit 69 with the output signal of R.F. phase shifter 66 to provide an I.F. error signal on conductor 71 which is coupled to the error detector 61 through the error I.F. amplifier 73 and the I.F. phase shifter 75. The azimuth servo system 77 is coupled to the output circuit of the error detector 61.

Details of the error detectors 47 and 61 which are identical in design and function are illustrated in FIG. 3 of the drawing. As shown therein, the incoming signals from the I.F. error phase shifter 51 or 75 is connected to the control grid of pentode V–1 through conductor 81 or 83. The plate circuit of pentode V–1 extends from the positive direct current supply line 85 through the parallel arrangement of resistor R–1 and the primary winding of transformer T–1, through the tube and through the parallel arrangement of resistor R–2 and condenser C–1 to the ground. The suppressor grid of pentode V–1 is connected as shown to its cathode. Condenser C–2 couples the plate of pentode V–1 to ground. The series connected secondary windings 87 and 89 of transformer T–1 complete a circuit that extends from terminal a, through diode D–1, resistor R–3, variable resistor R–4, resistor R–5, and diode D–2 to terminal b. Conductor 64 which provides an incoming signal from the reference I.F. amplifier 63 is connected to the junction of windings 87 and 89 of transformer T–1. Variable condenser C–3 is connected as shown in parallel with the series connected windings 87 and 89 of transformer T–1. The variable arm of resistor R–4 is connected as shown to ground as is the junction of series connected condensers C–4 and C–5 which are connected in parallel with the series arrangement of resistors R–3, R–4, and R–5. Variable resistor R–6 is also connected in parallel with the series arrangement of resistors R–3, R–4, and R–5. The variable arm 86 of resistor R–6 is connected to the control grid of triode V–2. The plate circuit of triode V–2 extends from the positive supply line 85 through the triode and through resistor R–7 to ground.

In operation noise energy from the sun is focused on the rectangular horn configuration of the receiver antenna assembly 3. Depending upon the orientation of the assembly in elevation and azimuth the energy is then directed in proportionate amounts through component horns A–D and the multiple paths of assembly 3 to conductors 37, 57, and 65 of the reference, elevation and azimuth channels of the receiver. The following equations describe this process mathematically:

$$Er = (Ea + Eb + Ec + Ed) L0° \qquad (1)$$
$$Ez = (Ea + Eb) L0° - (Ec + Ed) L0° \qquad (2)$$
$$El = (Eb + Ed) L + 90° + (Ea + Ec) L - 90° \qquad (3)$$

where $Er$ is the integrated reference signal, $Ez$ is the azimuth error signal, $El$ is the elevation error signal, $Ea$ is the signal that energizes element A of the horn assembly, $Eb$ is the signal that energizes element B of the horn assembly, $Ec$ is the signal that energizes element C of the horn assembly, $Ed$ is the signal that energizes element D of the horn assembly. $L0°$ indicates that the preceding signal or signals experience no change in phase, $L+90°$ indicates that the phase of the preceding signal or signals are advanced 90 degrees, and $L-90°$ indicates that the phase of the preceding signal or signals are retarded 90 degrees.

It will be noted from Equation 1 that when the noise signals from the sun are focused either at the center or off center of the horn assembly as indicated in any of the FIGS. 2A–2D, component signals $Ea$–$Ed$ are directed through the assembly and added in phase on conductor 57 for energization of the mixer 55. Thus energy $Ea$ from horn A is fed through conductor 23 and applied to the H plane of the magic T 15 and conductor 57 without appreciable phase shift from the zero phase angle of the noise input signal. Similarly energy $Ec$ from horn C is fed through conductor 33 and applied to the H plane of magic T 15 and conductor 57 without appreciable shift in phase. Energy $Eb$ from horn B is fed through conductor 9, through phase shifter 11 where its phase is advanced 90°, and through the slot coupler 21 where its phase is retarded 90° to conductor 23, the magic T 15, and conductor 57 such that no appreciable net shift phase from the phase of the input noise signal occurs. Similarly energy $Ed$ from horn D is fed through conductor 25, through the +90° phase shifter 27, and through the slot coupler 31 in which its phase is retarded 90° to conductor 33, magic T 15 and conductor 57 such that no appreciable phase shift of the signal occurs. Thus, whether or not the noise signal is accurately focused on the center of the rectangular antenna configuration so that equally divided components thereof feed horns A–D, signals $Ea$–$Ed$ are recombined on conductor 57 in phase to provide full signal energization of mixer 55 in the reference channel of the receiver.

It will be noted from Equation 2 that energy $Ea$ from horn A and energy $Ec$ from horn C are fed respectively through conductors 23 and 33 to the E plane of the magic T 15 where they combine in effect to provide a net difference signal on conductor 65. Similarly, energy $Eb$ from horn B and energy $Ed$ from horn D are fed respectively through conductors 9 and 25, +90° phase shifters 11 and 27, −90° slot couplers 21 and 31, and conductors 23 and 33 to the E plane of the magic T 15 where they also combine to provide a net difference signal on conductor 65. Thus, when the noise signals from the sun are focused on the vertical centerline of the antenna assembly 3 such that signal $Ea$ is equal in magnitude to signal $Ec$ and signal $Eb$ is equal in magnitude to signal $Ed$, no net error azimuth signal is provided. When, however, the signals from the sun are not focused on the vertical centerline of the horn assembly and signals $Ea$ and $Eb$ are not respectively equal in magnitude to signals $Ec$ and $Ed$, an azimuth error signal is then produced on conductor 65 proportional to the amount of the azimuth off-center focus.

It will be noted from Equation 3 that signal $Eb$ from horn B and signal $Ed$ from horn D are fed respectively through conductors 9 and 25, +90° phase shifters 11 and 27, and conductors 13 and 29 to the H plane of the magic T 5 where they combine on conductor 37 in phase with each other but 90° in phase ahead of the input noise signal from the sun. It will also be noted from Equation 3 that signal $Ea$ from horn A and signal $Ec$ from horn C are fed respectively through conductors 23 and 33, the −90° slot coupling devices 21 and 31 and conductors 13 and 29 to the H plane of magic T 5 where they combine on conductor 37 in phase with each other but 90° in phase behind the input noise signal from the sun. Thus, when the signals from the sun are focused on the horizontal centerline of the antenna assembly 3 such that signal $Eb$ is equal in magnitude to signal $Ea$ and signal $Ed$ is equal in magnitude to signal $Ec$, no net error elevation signal is provided. When, however, the signals from the sun are not focused on the horizontal centerline of the horn assembly and signals $Eb$ and $Ed$ are not respectively equal in magnitude to signal $Ea$ and $Ec$, an elevation error signal is then provided on conductor 37 proportional to the amount of the elevation off-center focus.

The elevation and azimuth error signals are then fed through their individual R.F. phase shift circuits 35 and 66 where their phase is adjusted so as to be in phase or 180° out of phase with the reference signal on conductor 57. The elevation and azimuth error signals and the reference signal on conductors 38, 57, and 68 are then converted to a predetermined I.F. signal in mixers 43, 55, and 69 by the output signal of the local oscillator 39. The I.F. elevation and azimuth error signals are then respectively amplified by amplifiers 49 and 73 and adjusted in phase by the conventional phase shift circuits 51 and 75 to again assure the in phase or the 180° out of phase relationship of the elevation and azimuth error signals with the reference signal. The I.F. reference signal from mixer 55 is also amplified by its amplifier 63. It is then fed into the elevation and azimuth error detectors 47 and 61 where the phase of the error signals, if they are present, are compared with the phase of the reference signal. This provides an output signal to the servo systems 53 and 77 having an amplitude that is proportional to the magnitude of the I.F. error signal and a polarity that is a function of the phase difference between the I.F. error signal and the reference signal.

The specific manner in which the phase detectors or comparators 47 and 61 operate may be more clearly understood by reference to FIG. 3 of the drawing. When no error signal is present in the elevation or azimuth channels of the receiver, the reference signal from the I.F. amplifier 63 is applied to the center of the split secondary winding of transformer T–1 by way of conductor 64. During the positive half of each cycle of the reference signal, current flows through winding 89 and through rectifier D–2 to develop a positive charge across condenser C–5. During alternative negative half cycles of the reference signal current flows from ground through condenser C–4, rectifier D–1 and winding 87 to develop a negative charge of substantially equal magnitude across condenser C–4. When the variable arm of resistor R–6 is properly centered, conductor 86 remains at ground potential and no connection signal is fed through the cathode follower circuit of triode V–2 to the servo system 53 or 77.

When an error signal that is in phase with the reference signal is developed, it is applied to the control grid of pentode V–1 by way of conductor 81 or 83 from the phase shift circuit 51 or 75. The error signal is amplified and applied to the split secondary winding of output transformer T–1 such that the potential at the top of secondary winding 87 is in phase with the reference signal and the potential at the bottom of secondary winding 89 is 180° out of phase with the reference signal. When this occurs, the effective charging potential for condenser C–5 through rectifier D–2 is decreased and the potential developed across condenser C–5 is also decreased. In a similar manner the effective charging potential for condenser C–4 through rectifier D–1 is increased and the potential developed across condenser C–4 is also increased. A negative potential proportional in magnitude to the magnitude of the error signal then appears at the variable arm of resistor R–6. This negative signal is then fed through the cathode follower circuit of triode V–2 to the servo system 53 or 77 which develops the desired adjustment of the orientation of the antenna assembly and tends to more accurately focus the antenna on the sun or other noise source that is to be tracked.

When an error signal that is 180° out of phase with the reference signal is developed, it is applied to the split secondary winding of transformer T–1 such that the potential at the top of secondary winding 87 is 180° out of phase with the reference signal and the potential at the bottom of secondary winding 89 is in phase with the reference signal. When this occurs, the effective charging potential for condenser C–5 through rectifier D–2 is increased and the potential developed across condenser C–5 is also increased. In a similar manner the effective charging potential for condenser C–4 through rectifier D–1 is decreased and the potential developed across condenser C–4 is also decreased. A positive potential proportional in magnitude to the magnitude of the error signal then appears at the variable arm of resistor R–6. This positive signal is then fed through the cathode follower circuit of triode V–2 to the servo system 53 or 77 which develops the desired adjustment of the orientation of the antenna assembly and tends to more accurately focus the antenna on the target.

Obviously many modifications and variations of the present invention are possible in the light of the above teachings. It is therefore to be understood that within the scope of the appended claim the invention may be practiced otherwise than as specifically described.

What is claimed is:

Radar tracking apparatus comprising:

(a) an antenna assembly including four horns disposed in a rectangular configuration;

(b) a first magic T network having an energy input waveguide section and a H plane energy output junction;

(c) a second magic T network having an energy input waveguide section, an E plane energy output junction and a H plane energy output junction;

(d) a pair of phase shifting devices that advance the phase of an input signal 90 degrees;

(e) a pair of slot coupling devices that retard the phase of a signal 90 degrees;

(f) means coupling a first horn of the antenna assembly to one end of the energy input waveguide section of the first magic T network through one of the phase shifting devices;

(g) means coupling a second horn of the antenna assembly which is in horizontal alignment with the first horn to the other end of the energy input waveguide section of the said first magic T network through the other phase shifting device;

(h) means coupling a third horn of the antenna assembly which is in vertical alignment with the first horn to one end of the energy input waveguide section of the second magic T network;

(i) means coupling a fourth horn of the antenna assembly which is in vertical alignment with the second horn to the other end of the energy input waveguide section of the said second magic T network;

(j) means coupling the output circuit of the said one phase shifting device to the said one end of the energy input waveguide section of the said second magic T network through one of the slot coupling devices;

(k) means coupling the output circuit of the said other phase shifting device to the said other end of the energy input waveguide section of the said second magic T network through the other slot coupling device;

(l) means for adjusting the phase of an output elevation error signal at the H plane junction of the said first magic T network such that it is in phase or 180 degrees out of phase with an output reference signal at the H plane junction of the said second magic T network;

(m) means for adjusting the phase of an output azimuth error signal at the E plane junction of the said second magic T network such that it is in phase or 180 degrees out of phase with the output reference signal at the H plane junction of the second magic T network;

(n) means including a local oscillator for converting the frequency of the elevation and azimuth error signals and the reference signal to a predetermined intermediate frequency;

(o) means for comparing the magnitude of the elevation and azimuth error signals with the magnitude of the reference signal;

(p) and a servo system responsive to the output circuit of the comparing means for controlling the orientation of the antenna assembly.

References Cited by the Examiner

UNITED STATES PATENTS

| 2,759,154 | 8/56 | Smith et al. | 343—7.4 |
|---|---|---|---|
| 2,931,032 | 3/60 | Newhouse | 343—7.4 |
| 2,950,474 | 8/60 | Page | 343—7.4 |
| 3,040,310 | 6/62 | Hausz | 343—7.4 |
| 3,040,317 | 6/62 | Newhouse | 343—7.4 |
| 3,090,952 | 5/63 | Kuck | 343—16 |

CHESTER L. JUSTUS, *Primary Examiner.*